United States Patent [19]
Takahashi

[11] Patent Number: 5,293,435
[45] Date of Patent: Mar. 8, 1994

[54] LIGHT DIVERGING/CONVERGING DEVICE, STRUCTURAL ELEMENT FOR SAID DEVICE AND METHOD OF PRODUCING SAID ELEMENT

[75] Inventor: Mitsuo Takahashi, Matsudo, Japan

[73] Assignee: Seikoh Giken Co., Ltd., Matsudo, Japan

[21] Appl. No.: 895,700

[22] Filed: Jun. 9, 1992

[30] Foreign Application Priority Data

Dec. 27, 1991 [JP] Japan .................................. 3-360532

[51] Int. Cl.⁵ .............................................. G02B 6/26
[52] U.S. Cl. ........................................ 385/85; 385/84; 385/47
[58] Field of Search ........................ 385/85, 50, 84, 76, 385/77, 47, 42, 45, 46, 43

[56] References Cited

U.S. PATENT DOCUMENTS

| | | | |
|---|---|---|---|
| 4,164,363 | 8/1979 | Hsu | 385/88 |
| 4,666,541 | 5/1987 | Le Noane et al. | 156/158 |
| 4,720,161 | 1/1988 | Malavieille | 385/43 |
| 4,950,318 | 8/1990 | Dyott | 385/146 |
| 5,000,530 | 3/1991 | Takahashi | 359/115 |

FOREIGN PATENT DOCUMENTS

| | | | |
|---|---|---|---|
| 1386734 | 2/1973 | United Kingdom | 385/15 |
| 1386734 | 3/1975 | United Kingdom | 385/15 |
| 2239719 | 7/1991 | United Kingdom | 385/15 |

*Primary Examiner*—John D. Lee
*Assistant Examiner*—Stephen W. Barns
*Attorney, Agent, or Firm*—Spencer, Frank & Schneider

[57] ABSTRACT

Two types of structural elements each employable for a light diverging/converging device are disclosed. One is a double circuit diverging ferrule which comprises a first semicylindrical ferrule element, a second semicylindrical ferrule element and a cylindrical bushing through which both the ferrule elements are press-fitted. The other is a single circuit converging ferrule which comprises a first semicylindrical ferrule element, a second solid semicylindrical ferrule and a cylindrical bushing through which both the ferrule elements are press-fitted. Three types of light diverging/converging devices, i.e., a diverging ratio variable type 1×2 circuit light diverging/converging device, a diverging ratio variable type 2×2 circuit light diverging/converging device and a 1×2 circuit light diverging/converging device having a constant diverging ratio each of which is constructed by using the aforementioned structural elements are also disclosed. A 2×2 circuit diverging unit, a tree type light diverging/converging device and a star type light diverging/converging device are modified light diverging/converging devices. A method of producing each of the aforementioned structural elements is further disclosed.

24 Claims, 7 Drawing Sheets

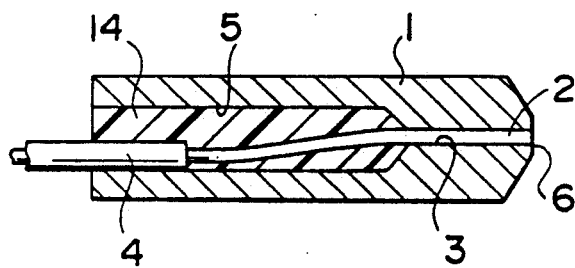
FIG. 1(a)
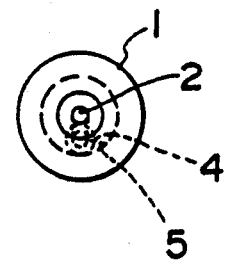
FIG. 1(a')
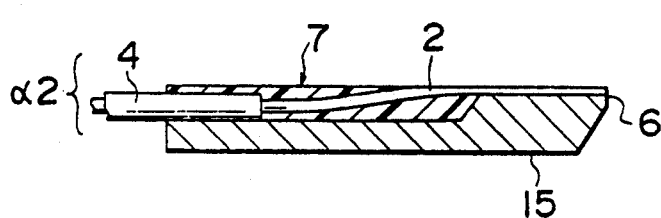
FIG. 1(b)
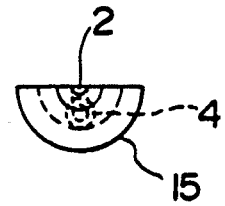
FIG. 1(b')
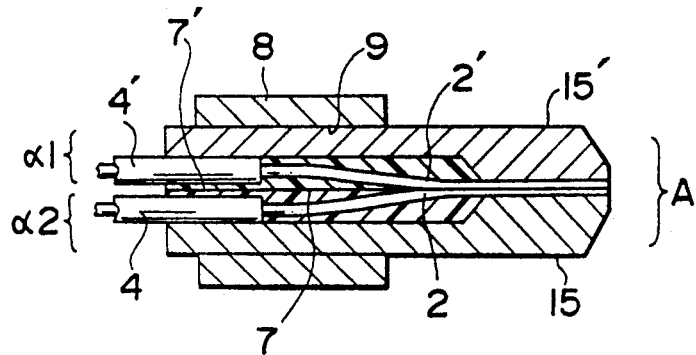
FIG. 1(c)
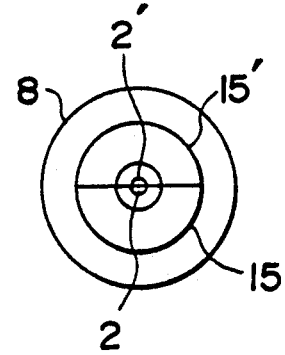
FIG. 1(c')
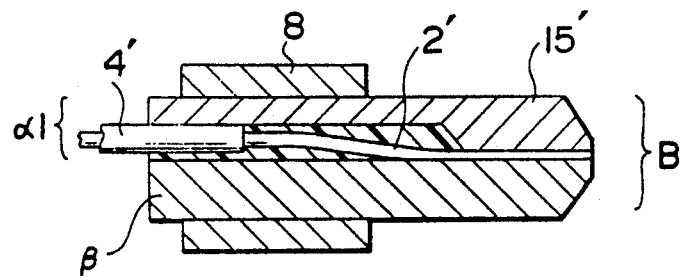
FIG. 2
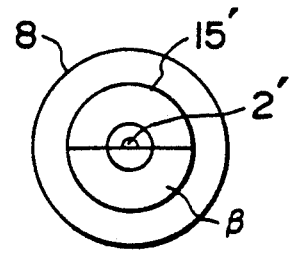
FIG. 2'

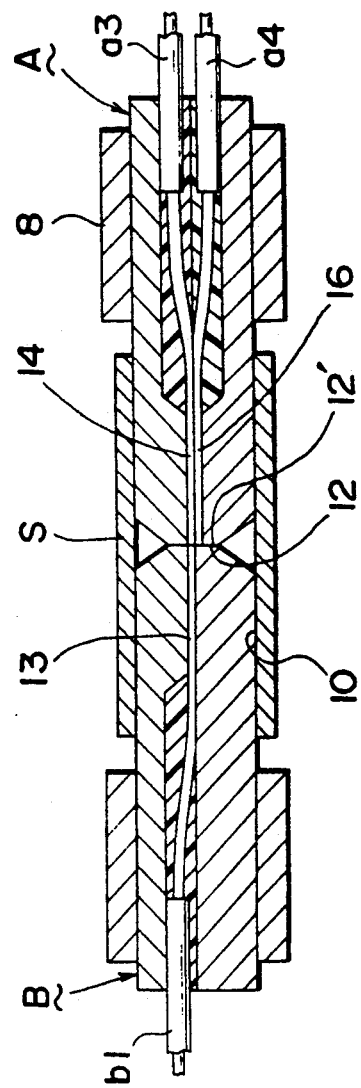

FIG. 4(a)
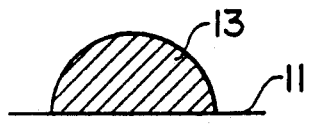
FIG. 4(a')
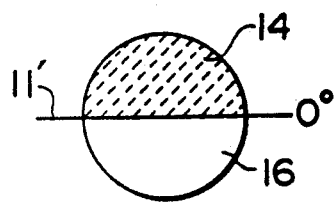
FIG. 4(b)
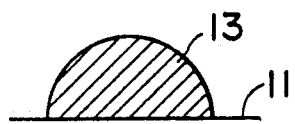
FIG. 4(b')
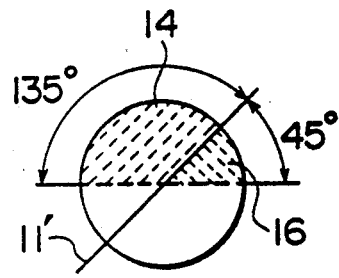
FIG. 4(c)
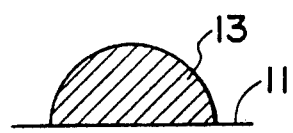
FIG. 4(c')
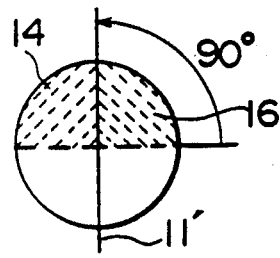
FIG. 4(d)
FIG. 4(d')
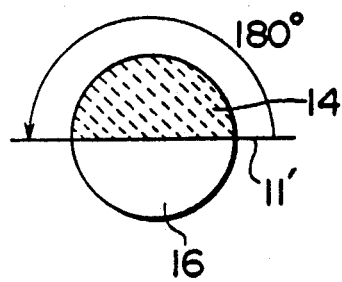

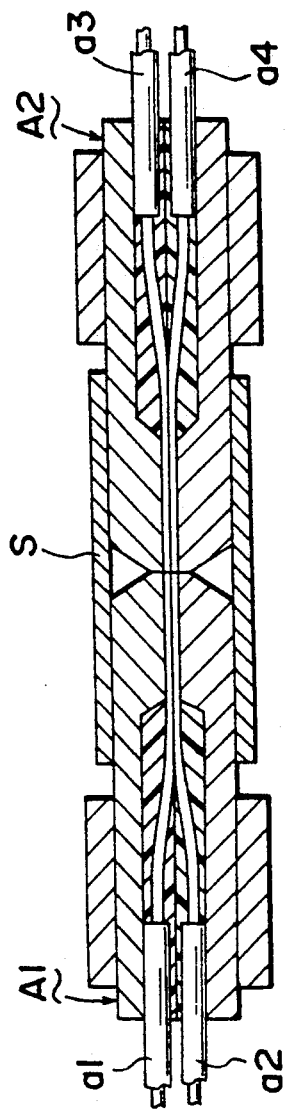
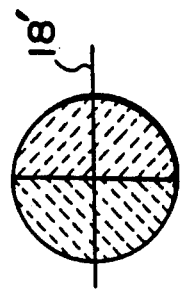
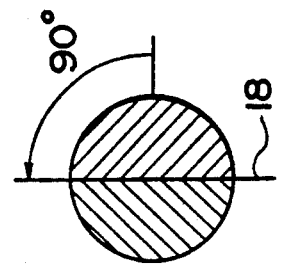

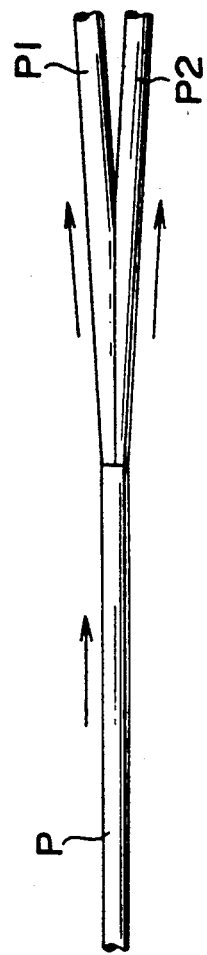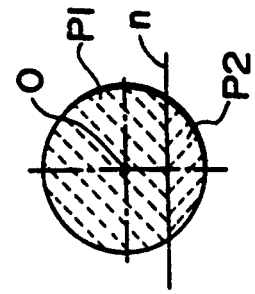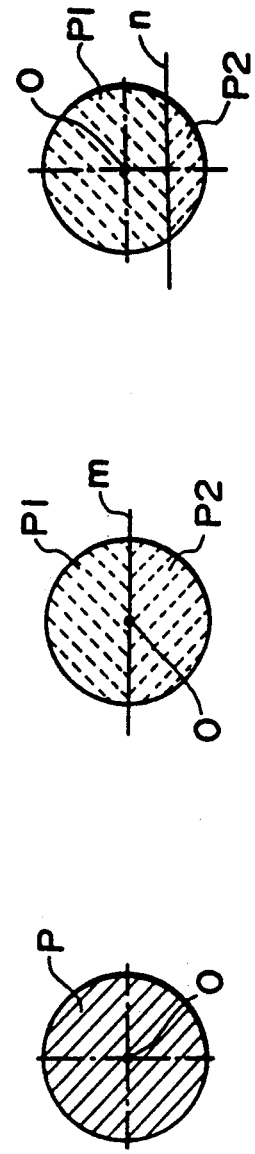

LIGHT DIVERGING/CONVERGING DEVICE, STRUCTURAL ELEMENT FOR SAID DEVICE AND METHOD OF PRODUCING SAID ELEMENT

BACKGROUND OF THE INVENTION

1. Field of the Invention

The present invention relates generally to a light diverging/converging device employable for an optical fiber communication system. More particularly, the present invention relates to a diverging ratio variable type diverging/converging device having no dependency on the wavelength of a light source wherein the end surface of an optical fiber comes in contact with the end surface(s) of an opponent optical fiber(s). Further, the present invention relates to a structural element such as a single circuit converging ferrule, a double circuit diverging ferrule or the like for a light diverging/converging device. In addition, the present invention relates to a method of producing a structural element for a light diverging/converging device such as a 1×2 circuit diverging unit or the like employable for a light diverging/converging device of the aforementioned type.

2. Description of the Related Art

Many kinds of light diverging/converging devices, each outputting optical power through a plurality of optical circuits branched from a single optical circuit while the initial power ratio is arbitrarily changed to 1:1 or the like, have been heretofore put in practical use for an optical fiber communication system.

With respect to each light diverging/converging device, it has been required that the diverging ratio hardly vary as a function of the wavelength of a light source, the device have few dependencies on the wavelength of the light source, the diverging ratio can selectively be determined with a high accuracy, a method of producing a structural element for the device can be practiced, and these structural elements can be produced with high efficiency on a mass production line.

Conventional light diverging devices and conventional light diverging/converging devices are typically classified by type in the following manner:

One of them is a thermally stretching type wherein two heated optical fibers are stretched to have a gradually reduced diameter while they come in close contact with each other and extend in parallel with each other in the longitudinal direction. Another one is a so-called block grinding type wherein V-shaped grooves are formed on one surface of a block, optical fibers each having a sheath removed therefrom are immovably placed in the respective V-shaped grooves with the aid of an adhesive, the optical fibers are subjected to plane grinding to such an extent that cores of the respective optical fibers are not exposed to the outside, and finally, the block thus prepared is assembled with an opponent block having the same structure as that of the first-mentioned one. It should be noted that an Evernescent effect is utilized for each of the aforementioned types.

However, the conventional diverging/converging device has a drawback in that its light diverging ratio largely varies dependent on the wavelength of a light source For this reason, the conventional diverging/converging device is not suitable for a multiple-wavelength type optical fiber communication system having a large capacity which is expected to widen its application fields in the near future.

In addition to the diverging/converging devices of the aforementioned types, a so-called optical fiber end surface connection type diverging/converging device is also known which is constructed such that end surfaces of two optical fibers longitudinally integrated with each other and each having a sheath removed therefrom on the diverging side of the device come in contact with a single optical fiber having a sheath removed therefrom on the converging side of the same.

Dependency of a diverging ratio of the optical fiber end surface connection type diverging/converging device on the wavelength of a light source is substantially equivalent to the characteristics of the optical fiber itself. For example, with respect to the wavelength of a widely used light source ranging from 800 to 1600 micronmeters, the dependency of the diverging ratio of the device on the wavelength of the light source is negligibly small. For this reason, the foregoing type light diverging/converging device is most suitably employable for the purpose of uniformly diverging and converging a plurality of multiple-wavelength signals each having a different wavelength.

Many proposals have been heretofore made with respect to a structure of a so-called optical fiber end surface connection type light diverging/converging device and a method of producing the same, as disclosed in U.S. Pat. Nos. 4,666,541 and 4,720,161.

However, the conventional light diverging/converging device as proposed in this way has the following drawbacks.

When the light diverging/converging device of the aforementioned type is produced, it is usually anticipated that there arises a diverging ratio error after completion of an assembling operation associated with a production error inherent to the optical fiber itself as well as a machining error during a machining operation for bisecting an optical fiber having a sheath removed therefrom. For this reason, it is inevitably necessary to prepare means for properly correcting the diverging ratio after completion of the assembling operation. For example, in the case of an optical fiber core having a diameter of 10 micronmeters and a diverging ratio of 5:1, the diverging ratio largely varies within the range of 14:1 to 3.5:1 when the bisectioned plane of an optical fiber is dislocated by a distance of ±1 micronmeter. For this reason, the diverging ratio should be corrected after completion of an assembling operation. However, each of the hitherto proposed conventional light diverging/converging devices does not take into account the aforementioned problems at all.

In the case which an optical fiber core on the output side is designated by P and optical fibers on the diverging side are designated by P1 and P2 as shown in FIGS. 9(a), (9c) and 9(d), to assure that the diverging/converging device has a diverging ratio of 50:50, the optical fibers P1 and P2 are machined in the axial direction and then longitudinally integrated with each other such that each of them is bisectioned into two halves along the cut line m which extends through a central point 0 of the optical fiber P where the ratio of the area of the machined optical fiber P1 to the area of the machined optical fiber P2 is 50:50, as shown in FIG. 9(c). In addition, when the diverging/converging device has a diverging ratio of 80:20, each of the optical fibers P1 and P2 is bisectioned into two halves along the cut line n which extends in conformity with the ratio of the area of the optical fiber P1 to the area of the optical fiber P2 corresponding to the given diverging ratio, as shown in FIG. 9(d).

A single mode optical fiber core does not exhibit a uniform light propagation mode not only at the central part but also around the outer peripheral region thereof. Especially, it has an unstable zone around the outer peripheral region. On the other hand, a multi-mode optical fiber core is constructed such that its refractive index varies from the central part to the outer peripheral region. For example, in case that the single mode optical fiber core has a diverging ratio of 80:20, it should be bisectioned into two halves along the cut plane located away from the central axis of the optical fiber by a distance of 2.7 micronmeters. For this reason, the light propagation portion of the optical fiber core becomes very unstable within the very narrow range having a width of 2.3 microns as measured from the outer diameter, resulting in a serious problem appearing from the viewpoint of the light diverging principle.

In addition, it is substantially impossible to machine an optical fiber having a sheath removed therefrom wherein the optical fiber has a different diameter corresponding to the diverging ratio to be obtained.

SUMMARY OF THE INVENTION

The present invention has been made in consideration of the aforementioned problems.

An object of the present invention is to provide a light diverging/converging device as well as a structural element for the light diverging/converging device wherein production control can easily be executed, the accuracy of the diverging ratio can be improved, and moreover, the diverging ratio can continuously be adjusted.

Another object of the present invention is to provide a 1×2N circuit light diverging/converging device or a 2N×2N circuit light diverging/converging device by using a plurality of diverging ratio variable type light diverging/converging devices.

A further object of the present invention is to provide a method of producing a structural element of the aforementioned type for the light diverging/converging device.

According to a first aspect of the present invention, there is provided a structural element for a light diverging/converging device in the form of a double circuit diverging ferrule, wherein the structural element comprises a first semicylindrical ferrule element having an optical fiber included therein with the aid of an adhesive; a second semicylindrical ferrule element having an optical fiber included therein with the aid of an adhesive to come in close contact with the first ferrule element in the face-to-face relationship along the central axis plane, the second ferrule element having the same configuration as that of the first ferrule element; and a cylindrical bushing through which the first ferrule element and the second ferrule element are press-fitted to build an integral structure while maintaining the face-to-face relationship between both ferrule elements.

Usually, each of the first ferrule element and the second ferrule element is prepared by way of the steps of inserting an optical fiber having a sheath removed therefrom through a central fine hole of a cylindrical ferrule member having a stepped hole formed therein, filling the stepped hole with an adhesive while locating the optical fiber at the offset position away from the central axis plane, grinding the foremost end of the cylindrical ferrule member at a right angle relative to the central axis plane, and then grinding the cylindrical ferrule member to reach the central axis plane until one half of the cylindrical ferrule member disappears.

According to a second aspect of the present invention, there is provided a structural element for a light diverging/converging device in the form of a single circuit converging ferrule, wherein the structural element comprises a first semicylindrical ferrule element having an optical fiber included therein with the aid of an adhesive; a second solid semicylindrical ferrule element having no optical fiber included therein to come in close contact with the first ferrule element in the face-to-face relationship along the central axis plane, the second ferrule element having the same configuration as that of the first ferrule element; and a cylindrical bushing through which the first ferrule element and the second ferrule element are press-fitted to build an integral structure while maintaining the face-to-face relationship between both the ferrule elements.

Usually, the second solid ferrule element including no optical fiber is prepared by way of the steps of grinding the foremost end of a solid cylindrical ferrule member at a right angle relative to the central axis plane and then grinding the cylindrical ferrule member to reach the central axis plane until one half of the cylindrical ferrule element disappears.

According to a third aspect of the present invention, there is provided a light diverging/converging device in the form of a light diverging ratio variable type 1×2 circuit light diverging/converging device, wherein the device comprises a single circuit converting ferrule serving as a structural element on the one side of the device; a double circuit diverging ferrule serving as a structural element on the other side of the same; and a common alignment sleeve into which the converging ferrule is rotatably press-fitted from the one side of the device with a low intensity of fitting force and the diverging ferrule is rotatably press-fitted from the other side of the same with a low intensity of fitting force until the foremost ends of the converging ferrule and the diverging ferrule come in close contact with each other to assume a predetermined diverging ratio.

With this construction, a diverging ratio is arbitrarily changed within the range of 100:0 to 0:100 by rotating one of the converging ferrule and the diverging ferrule relative to the other one.

According to a fourth aspect of the present invention, there is provided a light diverging/converging device in the form of a diverging ratio variable type 2×2 circuit light diverging/converging device, wherein the device comprises a first double circuit diverging ferrule serving as a structural element on the one side of the device; a second double circuit diverging ferrule serving as a structural element on the other side of the same; and a common alignment sleeve into which the first diverging ferrule is rotatably press-fitted from the one side of the device with a low intensity of fitting force and the second diverging ferule is rotatably press-fitted from the other side of the same until the foremost ends of both the diverging ferrules come in close contact with each other to assume a predetermined diverging ratio.

In this case, the diverging ratio is normally determined by rotating one of the first ferrule element and the second ferrule element relative to the other one by an angle of 90 degrees.

According to a fifth aspect of the present invention, there is provided a light diverging/converging device in the form of a 1×2 circuit light diverging/converging device having a constant diverging ratio, wherein the device comprises a single core optical fiber ferrule serving as a structural element on the one side of the device while an optical fiber extends along the central axis thereof; a double circuit diverging ferrule serving as a structural element on the other side of the same; and a common alignment sleeve into which the single core optical fiber ferrule is press fitted from the one side of the device and the diverging ferrule is press-fitted from the other side of the same until the foremost ends of the single core optical fiber ferrule and the double circuit diverging ferrule come in close contact with each other to assume a constant diverging ratio.

Usually, the single core optical fiber ferrule is prepared by way of the steps of inserting an optical fiber having a sheath removed therefrom through a central fine hole of a cylindrical ferrule member with the aid of an adhesive while extending along the central axis and then grinding the foremost end of the cylindrical ferrule member at a right angle relative to the central axis.

According to a sixth aspect of the present invention, there is provided a light diverging/converging device in the form of a 2×2 circuit diverging unit, wherein the device comprises a double circuit diverging ferrule serving as a structural element on the one side of the device; two optical fibers each extending from the diverging ferrule; and two single core optical fiber ferrules each serving as a structural element on the other side of the same.

According to a seventh aspect of the present invention, there is provided a light diverging/converging device in the form of a tree type light diverging/converging device comprising a plurality of 2×2 circuit light diverging units each defined in accordance with the sixth aspect of the present invention, wherein the 2×2 circuit light diverging units are removably successively connected to each other to build a 1×2N circuit or 2N×2N circuit where N designates a certain integral.

According to an eighth aspect of the present invention, there is provided a light diverging/converging device in the form of a star type light diverging/converging device comprising a plurality of 2×2 circuit light diverging units each defined in accordance with the sixth aspect of the present invention, wherein the 2×2 circuit light diverging units are removably successively connected to each other to build a 1×2N circuit or a 2N×2N circuit where N designates a certain integral.

According to a ninth aspect of the present invention, there is provided a method of producing a structural element for a light diverging/converging device in the form of a double circuit diverging ferrule, wherein the method comprises the steps of inserting an optical fiber having a sheath removed therefrom through a central fine hole of a cylindrical ferrule member having a stepped hole formed therein to immovably hold the optical fiber with the aid of an adhesive; filling the stepped hole with an adhesive to locate the optical fiber at the offset position away from the central axis plane; grinding the foremost end of the cylindrical ferrule member at a right angle relative to the central axis plane; grinding the cylindrical ferrule member to form a first semicylindrical ferrule element extending along the central axis plane until one half of the cylindrical ferrule member disappears; preparing a second semicylindrical ferrule element having the same configuration as that of the first one by performing the foregoing steps; bringing the first and second semicylindrical ferrule elements in close contact with each other to establish the face-to-face relationship between both the ferrule elements; and press-fitting a cylindrical assembly of the first and second semicylindrical ferrule elements into a cylindrical bushing to build an integral structure.

Finally, according to a tenth aspect of the present invention, there is provided a method of producing a structural element for a light diverging/converging device in the form of a single circuit converging ferrule, wherein the method comprises the steps of inserting an optical fiber having a sheath removed therefrom through a central fine hole of a cylindrical ferrule member having a stepped hole formed therein to immovably hold the optical fiber with the aid of an adhesive; filling the stepped hole with an adhesive to locate the optical fiber at the offset position away from the central axis plane; grinding the foremost end of the cylindrical ferrule member at a right angle relative to the central axis plane; grinding the cylindrical ferrule member to form a first semicylindrical ferrule element along the central axis plane until one half of the cylindrical ferrule member disappears; preparing a second semicylindrical solid ferrule element having no optical fiber included therein; bringing the first and second semicylindrical ferrule elements in close contact with each other to establish the face-to-face relationship between both the ferrule elements; and press-fitting a cylindrical assembly of the first and second semicylindrical ferrule elements into a cylindrical bushing to build an integral structure.

Other objects, features and advantages of the present invention will become apparent from reading of the following description which has been made in conjunction with the accompanying drawings.

BRIEF DESCRIPTION OF THE DRAWINGS

The present invention is illustrated in the following drawings in which:

FIGS. 1(a) and 1(a'), 1(b) and 1(b'), and 1(c) and 1(c') illustrate steps of producing a double circuit diverging ferrule for a light diverging/converging device in accordance with a first embodiment of the present invention, wherein FIG. 1(a) and 1(a') shows a sectional view and an end view respectively of a cylindrical ferrule member including an optical fiber employable for producing a double circuit diverging ferrule, FIG. 1(b) and 1(b') shows a sectional view and en end view respectively of a semicylindrical lower half of the ferrule element shown in FIG. 1(a) and 1(a') which is subjected to plane grinding to reach the axially extending center axis thereof, and FIG. 1(c) and 1(c') shows a double circuit diverging ferrule which is constructed by assembling two semicylindrical ferrule halves each as shown in FIG. 1(b) and 1(b') with each other to establish the face-to-face relationship therebetween;

FIG. 2 and 2' shows a sectional view and an end view of a single circuit converging ferrule for a light diverging/converging device in accordance with a second embodiment of the present invention;

FIG. 3 is a sectional view of a diverging ratio variable type 1×2 circuit light diverging/converging device in accordance with a third embodiment of the present invention;

FIGS. 4(a) and 4(a'), 4(b) and 4(b'), 4(c) and 4(c') and 4(d) and 4(d') illustrate by way of end views a relationship between a relative angle of an optical fiber core relative to opponent optical fiber core and a diverging ratio, particularly showing optical fiber cores at the time when a diverging ratio variable type 1×2 circuit diverging/converging device is produced;

FIGS. 5(a), 5(b) and 5(c) show a sectional view and end views of a light diverging/converging device in accordance with a fourth embodiment of the present invention, wherein FIG. 5(a) is a sectional view of a 2×2 circuit light diverging/converging device, and FIG. 5(b) and FIG. 5(c) are end views each showing the direction of a bisectioned plane between optical fiber core halves;

FIGS. 6(a), 6(b) and 6(c) show a sectional view and end views of a light diverging/converging device in accordance with a fifth embodiment of the present invention, wherein FIG. 6(a) is a sectional view of a 1×2 circuit light diverging/converging device, and FIG. 6(b) and FIG. 6(c) are end view each showing the direction of a bisectioned plane between optical fiber core halves;

FIGS. 9(a), 9(b), 9(c) and 9(d) illustrates by way of a side view and end views a conventional method of bisecting the end surfaces of optical fiber cores, wherein FIG. 9(a) is a side view showing the state that an optical fiber having a sheath removed therefrom is bifurcated, FIG. 9(b) is an end view of a single optical fiber core, FIG. 9(c) is an end view of optical fiber core halves at the time when a diverging ratio is set to 50:50, and FIG. 9(d) is an end view of optical fiber core halves at the time when the diverging ratio is set to 80:20.

DESCRIPTION OF THE PREFERRED EMBODIMENTS

Figure 6A:
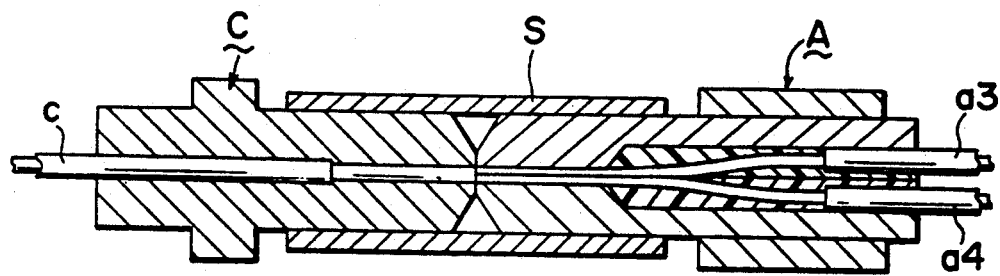

Now, the present invention will be described in detail hereinafter with reference to the accompanying drawings which illustrate preferred embodiments of the present invention.

FIGS. 1(a), 1(b) and 1(c) illustrate by way of sectional views and side views steps of producing a double circuit diverging ferrule which serves as a structural element for a light diverging/converging device in accordance with a first embodiment of the present invention.

A cylindrical ferrule member 1 includes a through hole 3 having a very small diameter through which an optical fiber 2 having a sheath 4 partially removed therefrom is inserted along an axially extending central axis thereof. In addition, the ferrule member 1 includes a stepped hole 5 for receiving the sheath 4 of an optical fiber.

After the optical fiber 2 is inserted through the through hole 3 and the stepped hole 5, the hollow space of the stepped hole 5 is filled with an adhesive 14. Thus, the sheath 4 is immovably held in the stepped hole 5 with the aid of the adhesive 14, and moreover, the optical fiber 2 is immovably held in the through hole 3 likewise with the aid of the adhesive 14.

Subsequently, the right-hand end of the ferrule member 1 and the right-hand end of the optical fiber 2 as seen in the drawings are ground at a right angle relative to the optical axis of the optical fiber 2 so as to form a ground end surface 6.

FIG. 1(a) and 1(a') illustrates by way of a sectional view and an end view a ferrule element which has been produced in the above-described manner.

Next, the ferrule element thus obtained is exactly divided into two parts along the central axis plane thereof such that one of the two parts, i.e., the upper part of the ferrule element is removed by a grinding operation. In other words, the ferrule element is subjected to plane grinding to exhibit a semicylindrical configuration.

FIG. 1(b) and 1(b') illustrates by way of a sectional view and an end view a ferrule element a2, comprising a ferrule member 15, which has been ground together with the optical fiber 2 to assume a semicylindrical configuration.

A next step is accomplished such that two ferrule elements a1 and a2, comprising ferrule members 15 and 15' for receiving optical fibers 2 and 2' respectively, shown in FIG. 1(c) are assembled in the face-to-face relationship and they are then press-fitted into a through hole 9 of a cylindrical bushing 8 while ground surfaces 7 and 7' of the ferrule elements a1 and a2 come in close contact with each other. Thus, both the ferrule elements a1 and a2 are integrated with each other with the aid of the cylindrical bush 8.

FIG. 1(c) and 1(c') illustrates by way of a sectional view and an end view a double circuit diverging ferrule A.

Similar to FIGS. 1(a) 1(a'), 1(b), 1(b'), 1(c) and 1(c'), FIGS 2 and 2' illustrates by way of a sectional view and an end view a single circuit converging ferrule which serves as an essential component for a light diverging-/converging device in accordance with a second embodiment of the present invention.

This single circuit converging ferrule B is produced by way of the same steps as those of the aforementioned double circuit ferrule A but the former is different from the latter in the following respect:

Specifically, a semicylindrical ferrule element $\beta$, i.e., one of two semicylindrical ferrules obtained by dividing a solid cylindrical ferrule member into two parts without any optical fiber attached thereto is substituted for the semicylindrical ferrule element a2 for the double circuit converging ferrule A as constructed in the above-described manner. The rest of the structure of the single circuit converging ferrule B is the same as that shown in FIGS. 1(a). 1(b) and 1(c). Thus, a repeated description will not be required.

FIG. 3 is a sectional view of a light diverging/converging device in accordance with a third embodiment of the present invention. Specifically, FIG. 3 illustrates by way of a sectional view the structure of a diverging ratio variable type 1×2 circuit light diverging/converging device which is constructed by assembling the single circuit converging ferrule B as shown in FIG. 2 with the double circuit diverging ferrule A as shown in FIGS. 1(a), 1(b) and 1(c) with the aid of a common alignment sleeve S.

The outer peripheral cylindrical portion of the ferrule B is rotatably press-fitted into the alignment sleeve S from the left-hand end side of the device with a low intensity of fitting force, while the outer peripheral cylindrical portion of the ferrule A is rotatably press-fitted into the alignment sleeve S from the right hand side of the device as seen in FIG. 3 with a low intensity of fitting force. The foremost end surfaces 12 and 12' of both the ferrules B and A come in close contact with each other by the resilient force of compression springs (not shown) to provide an assembly comprising the ferrule A and the ferrule B in the presence of the alignment sleeve S.

FIGS. 4(a), 4(b), 4(c) and 4(d) illustrate by way of four end views the relationship between the relative angle of a ferrule half relative to an opponent ferrule half and a diverging ratio at the time when the diverging ratio variable type 1×2 circuit diverging/converging device shown in FIG. 3 is produced.

Referring to FIGS. 4(a), 4(a'), 4(b), 4(b'), 4(c), 4(c'), and 4(d) and 4(d'), an output port 13 corresponds to a core half of an optical fiber b1, a light receiving port 14 corresponds to a core half of an optical fiber a3, and a light receiving port 16 corresponds to a core half of an optical fiber a4 (see FIG. 3).

In detail, FIG. 4(a) and 4(a') illustrates the case that a bisectioned line 11 of the core half of the optical fiber b1 extending through the ferrule B matches with a bisectioned line 11' of the core half of the optical fiber a3 extending through the ferrule A. In this case, the bisectioned line 11' of the ferrule A assumes a rotational angle of zero based on the rotational angle of the bisectioned line 11 of the ferrule B as a reference. At this time, the surface on which the output port 13 of the optical fiber b1 comes in contact with the light receiving ports 14 and 16 of the optical fibers a3 and a4 is represented by hatched lines. In practice, the output port 13 of the optical fiber b1 comes in contact only with the light receiving port 14 of the optical fiber a3. It should be noted that the same conditions exist for the cases shown in each of FIGS. 4(b), 4(b') to FIGS. 4(d) to 4(d').

In each of the illustrated cases, only the light receiving port 14 of the optical fiber a3 receives a light beam but the light receiving port 16 of the optical fiber a4 does not receive a light beam. Therefore, the diverging ratio of the device is represented by the following equation:

light receiving port 14:light receiving port 16=100:0

FIG. 4(b) and 4(b') illustrates by way of end views the state wherein the ferrule A is rotated in the anticlockwise direction by an angle of 45 degrees relative to the ferrule B. In this case, the light receiving surface of the light receiving port 14 of the optical fiber a3 exhibits a sector-shaped contour which is defined by the bisectioned line 11', the radially extending line representing an angle of 135 degrees and the outer diameter line of the light receiving port 14. On the other hand, the light receiving surface of the light receiving port 16 exhibits a sector-shaped contour which is defined by the bisectioned line 11', the radially extending line representing an angle of 45 degrees and the outer diameter line of the light receiving port 14. Therefore, the diverging ratio of the device is represented by the following equation.

light receiving port 14:light receiving port 16=75:25

FIGS. 4(c) and 4(c') illustrates by way of end views the state that the ferrule A is rotated by an angle of 90 degrees relative to the ferrule B. In this case, the diverging ratio of the device is represented by the following equation:

light receiving port 14:light receiving port 16=50:50

FIGS. 4(d) and 4(d') illustrates by way of end views the state that the ferrule A is rotated by an angle of 180 degrees relative to the ferrule B. In this case, the diverging ratio is represented by the following equation:

light receiving port 14:light receiving port 16=0:100

It is apparent from the above description that the diverging ratio largely varies within the range of 0:100 to 100:0, that each light receiving surface exhibits a sector-shaped contour which is defined by two bisectioned lines extending along the center axis of the optical fiber core and the outer diameter line, and that a diverging ratio variable type 1×2 circuit light diverging/converging device capable of uniformly diverging a light beam can be obtained.

FIG. 5 (a) illustrates by way of a sectional view a light diverging/converging device in accordance with a fourth embodiment of the present invention. In addition, FIG. 5(b) illustrates by way of an end view a port on the A1 side of a double circuit diverging ferrule, while FIG. 5(c) illustrates by way of an end view a port on the A2 side of another double circuit diverging ferrule.

These drawings illustrate by way of an example a 2×2 circuit light diverging/converging device which is constructed such that two double circuit diverging ferrules A1 and A2 are rotatably press-fitted into an alignment sleeve S with a low intensity of fitting force. According to this embodiment, in principle, two bisectioned lines 18 and 18' intersect each other with an angle of 90 degrees as shown in FIG. 5(b) and FIG. 5(c).

Figures 6B, 6C:
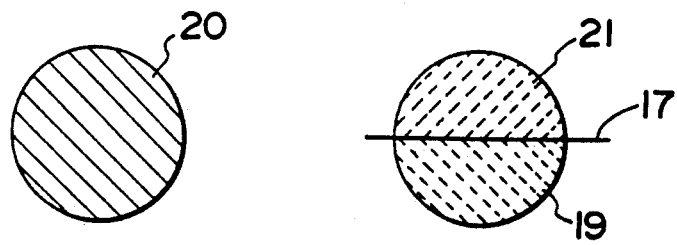

FIG. 6(a) illustrates by way of a sectional view a light diverging/converging device in accordance with a fifth embodiment of the present invention. FIG. 6(b) illustrates by way of an end view an output port 20 of a ferrule C including a single core optical fiber, while FIG. 6(c) illustrates by way of an end view light receiving ports 19 and 21 of a double circuit diverging ferrule A.

The output port 20 shown in FIG. 6(b) exhibits the end surface of a core of an optical fiber c extending along the center axis of a ferrule C, while the light receiving ports 19 and 21 shown in FIG. 6(c) exhibit the end surfaces of core halves of optical fibers each extending along the center axis of the ferrule A.

This embodiment illustrates by way of an example a 1×2 circuit light diverging/converging device which is constructed by assembling the ferrule C, the ferrule A and a common alignment sleeve S in the same manner as the embodiment shown in FIGS. 5(a), 5(b) and 5(c). A light beam output from the output port 20 of the ferrule C is received by the light receiving ports 19 and 21 each having a bisectioned light receiving surface with a surface area ratio of 50:50.

In this embodiment, however, since the device certainly contains an accuracy error inherent in the optical fiber or the ferrule member or an accumulative error due to errors arising during the machining/assembling operations, there often arises a malfunction that the practically measured light diverging ratio departs largely from a predetermined light diverging ratio of 50:50.

Especially, a main factor which causes an error having a significant effect on the diverging ratio accuracy is positional deviation of the center axis of an optical fiber extending through a ferrule away from the center axis of an optical fiber(s) extending through another ferrule.

With respect to a ferrule including a single mode optical fiber, the results obtained from measurements conducted for determining the quantity of positional deviation of the optical fiber core relative to the outer diameter of the ferrule after completion of an assembling operation often reveal that the positional deviation is distributed within the range of 0.2 to 1.0 micron. In the foregoing circumstances, if a maximum error is caused in the opposite direction relative to the center axis of an optical fiber core away from that of the ferrule, there is a possibility that 2.0 microns of maximum positional deviation of one optical fiber core from the other optical fiber core arises therebetween. In this case, the diverging ratio is changed to about 57:43.

To obviate the foregoing malfunction, a proposal has been made with respect to a method of minimizing the quantity of positional deviation of a ferrule from another ferrule by rotating the former relative to the latter in consideration of the facts that positional deviation of the center axis of an optical fiber core away from the outer diameter of the corresponding ferrule can be reduced to a level of zero with a probability of about zero and that the optical fiber and the ferrule are often assembled with each other with about 0.5 micron of positional deviation therebetween on an average. When the aforementioned method is practically employed, the diverging ratio can be improved to a level of about 53:47. In this case, although the variable range of the diverging ratio is narrow, it can be construed that the resultant light diverging/converging device for which this method is employed belongs to a category of a kind of diverging ratio variable type $1 \times 2$ circuit light diverging/converging device.

According to the present invention, the diverging ratio variable type $1 \times 2$ circuit light diverging/converging device serves as a unit constituting a light diverging/converging device having many diverging circuits, e.g., a $1 \times 32$ circuit tree type light diverging/converging device, a $32 \times 32$ circuit star type light diverging/converging device or the like. Thus, it is obvious that the principle of changing the diverging ratio in accordance with the present invention is important.

It should be added that in the case in which no adjustment is conducted for a $1 \times 32$ circuit tree type light diverging/converging device, the error caused with the final diverging ratio of the device is remarkably undesirably elevated to a maximum level of 80:20.

In contrast with this, according to the present invention, since an adjustment can practically be conducted for the device at every operational stop, it has been confirmed that the diverging ratio can be improved within the range represented by 55:45 and that good results can be obtained with the device with respect to light divergence and convergence.

Figure 7:
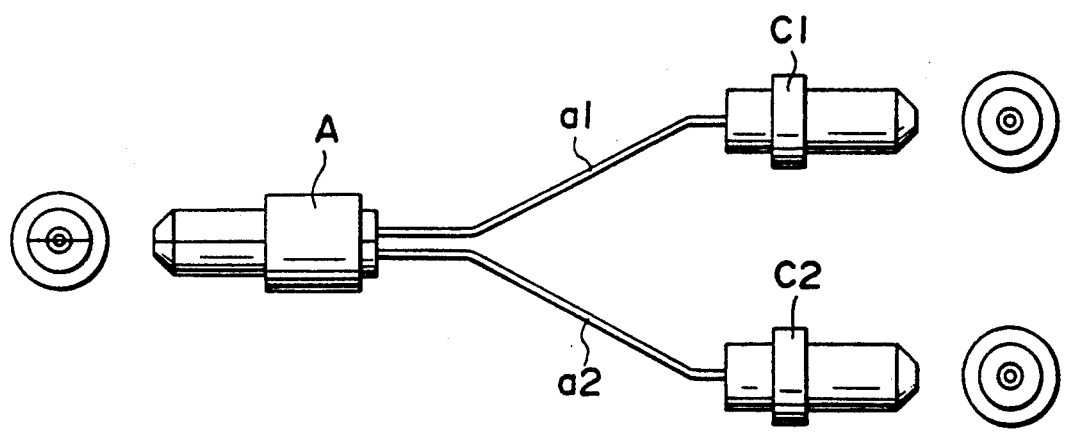
FIG. 7 is a diagrammatical view of a light diverging-/converging device in the form of a 2×2 circuit light diverging unit in accordance with a sixth embodiment of the present invention.

FIG. 7 illustrates by way of a diagrammatical view a sixth embodiment of the present invention.

This embodiment is concerned with a $2 \times 2$ circuit light diverging unit U which is constructed such that terminals of two optical fibers a1 and a2 extending from a double circuit diverging ferrule A are coupled to single core optical fiber ferrules C1 and C2 to build an integral structure.

Figure 8:
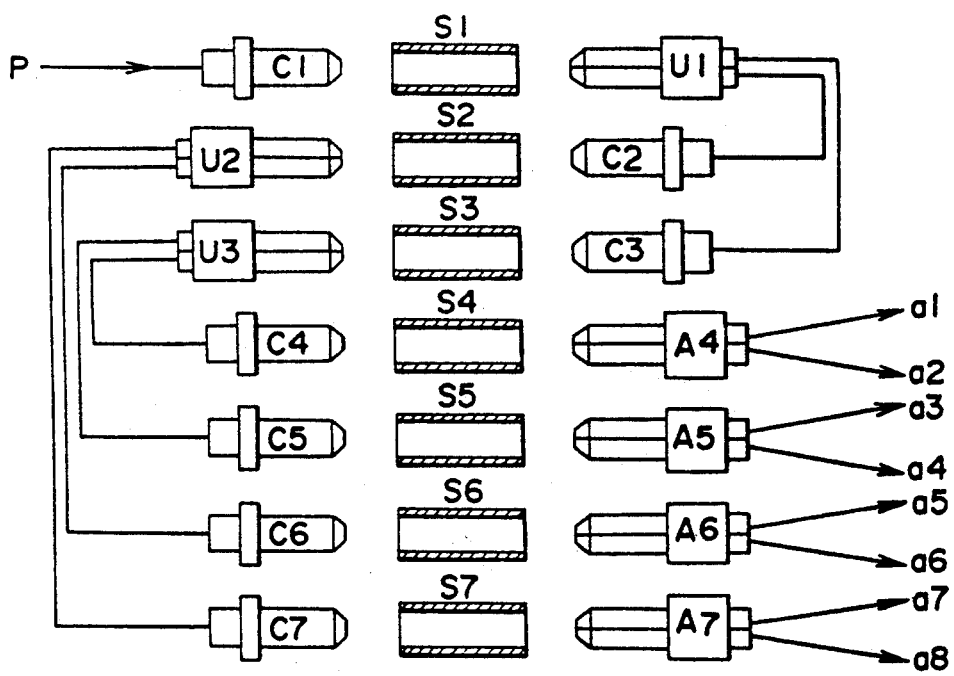
FIG. 8 is a diagrammatical view of a light diverging-/converging device in the form of a 1×8 tree type light diverging device in accordance with a seventh embodiment of the present invention wherein three 2×2 circuit light diverging units shown in FIG. 7 are successively connected to each other to constitute the device.

FIG. 8 illustrates by way of a diagrammatical view a seventh embodiment of the present invention. This embodiment exemplifies a $1 \times 8$ circuit tree type light diverging device which is constructed using three light diverging ferrule units U1, U2 and U3.

Referring to the drawing, a single core optical fiber ferrule C1 is connected to a primary light diverging ferrule unit U1 with the aid of an alignment sleeve S1, ferrules C2 and C3 at the other end of the ferrule unit U1, i.e. on the converging side of the same are connected to secondary light diverging units U2 and U3 with the aid of alignment sleeves S2 and S3, and the other ends of the units U2 and U3 are branched into four circuits comprising ferrules C4, C5, C6 and C7 on the converging side. In addition, the ferrules C4, C5, C6 and C7 are connected to four ferrules A4, A5, A6 and A7 on the diverging side with the aid of alignment sleeves S4, S5, S6 and S7.

With this construction, an output light P introduced into the single core optical fiber ferrule C1 is diverged and output to optical fibers a1 to a8 including eight circuits in total.

Of course, it is obvious that an $8 \times 8$ circuit star type light diverging/converging device can be constructed by using 2 sets of $1 \times 8$ tree type light diverging/converging devices.

As is apparent from the above description, according to the present invention, a light diverging/converging device can basically be constructed in the form of a diverging ratio variable type $1 \times 2$ circuit light diverging/converging device wherein end surfaces of optical fibers are connected to each other not only without variation of a light diverging ratio due to the wavelength of a light source but also without drawbacks inherent to the conventional light diverging device of the aforementioned type. Consequently, the present invention offers the following advantageous effects:

(1) Only one kind of optical fiber core including bisectioned surfaces is employed for all the devices regardless of a diverging ratio. Thus, the accuracy of the diverging ratio can be improved.

(2) The device is basically constructed such that three members comprising two cylindrical ferrules and a common alignment sleeve having the cylindrical ferrules fitted thereinto are removably assembled with each other, and moreover, the relative angle of one ferrule relative to the other one can adequately be adjusted by rotating one of the ferrules press-fitted into the alignment sleeve. Thus, the surface area ratio of an area of a sector-shaped sectional contour defined by two bisectioned lines extending along the center axes of optical fiber cores and the outer diameter line of the same at two ports on the diverging side of the device to a total sectional area of the optical fiber cores can continuously be changed. This makes it possible to adjust the light beam transmitted from the output port at an arbitrary diverging ratio.

(3) When a plurality of $2 \times 2$ circuit light diverging units are connected to each other, not only a $1 \times 2N$ circuit tree type light diverging device but also a $2N \times 2N$ star type light diverging device can simply be constructed with them. In this case, since each $2 \times 2$ circuit light diverging unit is removably inserted into the corresponding alignment sleeve, the diverging ratio of optical fibers on the diverging side of each unit can be made uniform and moreover, the accuracy of the diverging ratio of the device can be improved overall. When there arises a malfunction that one of the $2 \times 2$ circuit light diverging units fails to operate correctly, the incorrectly operable unit can simply be exchanged for a new one. This contributes to a remarkable improvement of function and economical convenience of each device from the viewpoint of maintenance and control of an optical communication system.

(4) In addition, various types of optical elements can be produced by a proper combination of essential elements for the device based on the structural principle of the present invention. In this case, an optical fiber selected from a group comprising a multi-mode optical fiber, a single mode optical fiber, a uniformly polarized optical fiber and a dispersively shifted optical fiber can singly be used as an optical fiber for the device. Alternatively, plural optical fibers selected from the foregoing group may be used in the combined state. Further, since the device has few dependencies on the wavelength of a light surface as mentioned above, it can advantageously be employed as a light diverging/converging device for an optical fiber gyroscope, an optical fiber amplifier or the like.

While the present invention has been described above only with respect to several preferred embodiments thereof, it should of course be understood that the present invention should not be limited only to these embodiments but various changes or modifications may be made without departure from the scope of the present invention as defined by the appended claims.

What is claimed is:

1. The method of making a structural element for a light diverging/converging device in the form of a double circuit diverging ferrule, said structural element including first and second semicylindrical ferrule elements of the same configuration, each ferrule element having an optical fiber secured therein by an adhesive and being in a close contact face-to-face relationship along a central axis plane, and a cylindrical bushing through which said first and second ferrule elements are press-fit to build an integral structure while maintaining the face-to-face relationship therebetween, wherein each of said first and second ferrule elements is prepared by the steps of
    inserting an optical fiber having a sheath removed therefrom through a central fine hole of a cylindrical ferrule member having a stepped hole formed therein;
    filling said stepped hole with an adhesive while locating said optical fiber at an offset position away from the central axis plane;
    grinding the foremost end of said cylindrical ferrule member at a right angle relative to the central axis plane; and
    grinding said cylindrical ferrule member to reach the central axis plane until one half of the cylindrical ferrule member is removed.

2. The method of making a structural element for a light diverging/converging device in the form of a single circuit converging ferrule, said structural element including a first semicylindrical ferrule element and a second solid semicylindrical ferrule element, said first ferrule element having an optical fiber secured therein by an adhesive and said second solid ferrule element having no optical fiber included therein, said second ferrule element being in a close contact face-to-face relationship with said first ferrule element along a central axis plane, and a cylindrical bushing through which said first and second ferrule elements are press-fit to build an integral structure while maintaining the face-to-face relationship therebetween, wherein said first ferrule element is prepared by the steps of
    inserting an optical fiber having a sheath removed therefrom through a central fine hole of a cylindrical ferrule member having a stepped hole formed therein;
    filling said stepped hole with an adhesive while locating an optical fiber at an offset position away from the central axis plane;
    grinding the foremost end of said cylindrical ferrule member at a right angle relative to the central axis plane; and
    grinding said cylindrical ferrule member to reach the central axis plane until one half of the cylindrical ferrule member is removed.

3. The method of making a structural element for a light diverging/converging device in the form of a single circuit converging ferrule, said structural element including a first semicylindrical ferrule element and a second solid semicylindrical ferrule element, said first element having an optical fiber secured therein by an adhesive and said second solid ferrule element having no optical fiber included therein, said second ferrule element being in a close contact face-to-face relationship with said first ferrule element along a central axis plane, and a cylindrical bushing through which said first and second ferrule elements are press-fit to build an integral structure while maintaining the face-to-face relationship therebetween, wherein said second solid ferrule element is prepared by the steps of
    grinding the foremost end of a solid cylindrical ferrule member at a right angle relative to the central axis plane; and
    grinding said solid cylindrical ferrule member to reach the central axis plane until one half thereof is removed.

4. A light diverging/converging device in the form of a diverging ratio variable type 1×2 circuit light diverging/converging device, comprising;
    a single circuit converging ferrule serving as a structural element on a first side of said device, said single circuit converging ferrule comprising a first semicylindrical ferrule element having an optical fiber secured therein by an adhesive and a second solid semicylindrical ferrule element of the same configuration as said first ferrule element having no optical fiber therein, said second solid ferrule element being in a close contact face-to-face relationship with said first ferrule element along a central axis plane, and a cylindrical bushing through which said first and second ferrule elements are press-fit to build an integral structure while maintaining the face-to-face relationship therebetween;
    a double circuit diverging ferrule serving as a structural element on a second side of said device; and
    a common alignment sleeve into which said converging ferrule is rotatably press-fit from said first side of the device with a low intensity of fitting force and said diverging ferrule is rotatably press-fit from the second side of the device with a low intensity of fitting force until the foremost ends of said converging ferrule and said diverging ferrule come in close contact with each other to assume a predetermined diverging ratio.

5. The device as claimed in claim 4 wherein said first ferrule element is prepared by the steps of
    inserting an optical fiber having a sheath removed therefrom through a central fine hole of a cylindrical ferrule member having a stepped hole formed therein;

filling said stepped hole with an adhesive while locating said optical fiber at an offset position away from the central axis plane;

grinding the foremost end of said cylindrical ferrule member at a right angle relative to the central axis plane; and grinding said cylindrical ferrule member to reach the central axis plane until one half of the cylindrical ferrule member is removed.

6. The device as claimed in claim 4 wherein said second ferrule element is prepared by the steps of grinding the foremost end of a solid cylindrical ferrule member at a right angle relative to the central axis plane; and grinding said solid cylindrical ferrule member to reach the central axis plane until one half thereof is removed.

7. A light diverging/converging device in the form of a diverging ratio variable type 1×2 circuit light diverging/converging device, comprising;

a single circuit converging ferrule serving as a structural element on a first side of said device;

a double circuit diverging ferrule serving as a structural element on a second side of said device, said double circuit diverging ferrule comprising first and second semicylindrical ferrule elements of the same configuration, each having an optical fiber secured therein by an adhesive and being in a close contact face-to-face relationship along a central axis plane, and a cylindrical bushing through which said first and second ferrule elements are press-fit to build an integral structure while maintaining the face-to-face relationship therebetween; and a common alignment sleeve into which said converging ferrule is rotatably press-fit from said first side of the device with a low intensity of fitting force and said diverging ferrule is rotatably press-fit from a second side of the device with a low intensity of fitting force until the foremost ends of said converging ferrule and said diverging ferrule come in close contact with each other to assume a predetermined diverging ratio.

8. The device as claimed in claim 7, wherein each of said first and second ferrule elements is prepared by the steps of inserting an optical fiber having a sheath removed therefrom through a central fine hole of a cylindrical ferrule member having a stepped hole formed therein;

filling said stepped hole with an adhesive while locating said optical fiber at an offset position away from the central axis plane;

grinding the foremost end of said cylindrical member at a right angle relative to the central axis plane; and grinding said cylindrical ferrule member to reach the central axis plane until one half of the cylindrical ferrule member is removed.

9. A light diverging/converging device in the form of a diverging ratio variable type 1×2 circuit light diverging/converging device, comprising;

a single circuit converging ferrule serving as a structural element on a first side of said device, said single circuit converging ferrule comprising a first semicylindrical ferrule element having an optical fiber secured therein by an adhesive and a second solid semicylindrical ferrule element of the same configuration as said first ferrule element having no optical fiber therein, said second solid ferrule element being in a close contact face-to-face relationship with said first ferrule element along a central axis plane, and a cylindrical bushing through which said first and second ferrule elements are press-fit to build an integral structure while maintaining the face-to-face relationship therebetween;

a double circuit diverging ferrule serving as a structural element on a second side of said device; and a common alignment sleeve into which said converging ferrule is rotatably press-fit from said first side of the device with a low intensity of fitting force and said diverging ferrule is rotatably press-fit from the second side of the device with a low intensity of fitting force until the foremost ends of said converging ferrule and said diverging ferrule come in close contact with each other to assume a predetermined diverging ratio, said diverging ratio being arbitrarily changed within the range of 100:0 to 0:100 by rotating one of said converging ferrule and said diverging ferrule relative to the other one.

10. A light diverging/converging device in the form of a diverging ratio variable type 2×2 circuit light diverging/converging device, comprising;

a first double circuit diverging ferrule serving as a structural element on a first side of said device;

a second double circuit diverging ferrule serving as a structural element on a second side of said device; and a common alignment sleeve into which said first diverging ferrule is rotatably press-fit from the first side of the device with a low intensity of fitting force and said second diverging ferrule is rotatably press-fit from the second side of the device until the foremost ends of both the diverging ferrules come in close contact with each other to assume a predetermined diverging ratio.

11. The device as claimed in claim 10, wherein each of said first and second diverging ferrules comprises a first semicylindrical ferrule element having an optical fiber secured therein by an adhesive;

a second semicylindrical ferrule element having an optical fiber secured therein by an adhesive, said second ferrule element coming into close contact with said first ferrule element in a face-to-face relationship along a central axis plane, said second ferrule element having the same configuration as that of said first ferrule element; and a cylindrical bushing through which said first and second ferrule elements are press-fit to build an integral structure while maintaining the face-to-face relationship therebetween.

12. The device as claimed in claim 11, wherein each of said first and second ferrule elements is prepared by the steps of inserting an optical fiber having a sheath removed therefrom through a central fine hole of a cylindrical ferrule member having a stepped hole formed therein;

filling said stepped hole with an adhesive while locating said optical fiber at an offset position away from the central axis plane;

grinding the foremost end of said cylindrical ferrule element at a right angle relative to the central axis plane; and grinding said cylindrical ferrule member to reach the central axis plane until one half of the cylindrical ferrule member is removed.

13. The device as claimed in claim 11, wherein the diverging ratio is arbitrarily changed by rotating one of said first and second ferrule element relative to the other one.

14. The device as claimed in claim 13, wherein said diverging ratio is determined by rotating one of said first and second ferrule element relative to the other one through an angle of 90 degrees.

15. A light diverging/converging device in the form of a 1×2 circuit light diverging/converging device having a constant diverging ratio, comprising;
- a single core optical fiber ferrule serving as an essential element on a first side of said device while an optical fiber extends along a central axis thereof, said single core optical fiber ferrule being prepared by the steps of inserting an optical fiber having a sheath removed therefrom through a central fine hole of a cylindrical ferrule member and secured to said ferrule member by an adhesive while extending along the central axis, and grinding the foremost end of said cylindrical ferrule member at a right angle relative to the central axis;
- a double circuit diverging ferrule serving as a structural element on a second side of the device; and
- a common alignment sleeve into which said single core optical fiber ferrule is press-fit from the first side of the device and said diverging ferrule is press-fit from the second side of the device until the foremost ends of said single core optical fiber ferrule and said double circuit diverging ferrule come in contact with each other to assume a constant diverging ratio.

16. A light diverging/converging device in the form of a1×2 circuit light diverging/converging device having a constant diverging ratio, comprising;
- a single core optical fiber ferrule serving as an essential element on a first side of said device while an optical fiber extends along a central axis plane thereof;
- a double circuit diverging ferrule serving as a structural element on a second side of the device, said double circuit diverging ferrule comprising first and second semicylindrical ferrule elements of the same configuration, each having an optical fiber secured therein by an adhesive and being in a close contact face-to-face relationship along the central axis plane, and a cylindrical bushing through which said first and second ferrule elements are press-fit to build an integral structure while maintaining the face-to-face relationship therebetween; and
- a common alignment sleeve into which said single core optical fiber ferrule is press-fit from the first side of the device and said diverging ferrule is press-fit from the second side of the device until the foremost ends of said single core optical fiber ferrule and said double circuit diverging ferrule come in contact with each other to assume a constant diverging ratio.

17. The device as claimed in claim 16, wherein each of said first and second ferrule elements is prepared by the steps of
- inserting an optical fiber having a sheath removed therefrom through a central fine hole of a cylindrical ferrule member having a stepped hole formed therein;
- filling said stepped hole with an adhesive while locating said optical fiber at an offset position away from the central axis plane;
- grinding the foremost end of said cylindrical ferrule member at a right angle relative to the central axis plane; and
- grinding said cylindrical ferrule member to reach the central axis plane until one half of the cylindrical ferrule member is removed.

18. A light diverging/converging device in the form of a 2×2 circuit diverging unit, comprising;
- a double circuit diverging ferrule serving as a structural element on a first side of said device, said double circuit diverging ferrule including first and second semicylindrical ferrule elements of the same configuration, each having an optical fiber secured therein by an adhesive and being in a close contact face-to-face relationship along a central axis plane; and
- a cylindrical bushing through which said first and second ferrule elements are press-fit to build an integral structure while maintaining the face-to-face relationship therebetween;
- two optical fibers each extending from said diverging ferrule; and
- two single core optical fiber ferrules each serving as a structural element on a second side of the device.

19. The device as claimed in claim 18, wherein each of said first and second ferrule elements is prepared by the steps of
- inserting an optical fiber having a sheath removed therefrom through a central fine hole of a cylindrical ferrule member having a stepped hole formed therein;
- filling said stepped hole with an adhesive while locating said optical fiber at an offset position away from a central axis plane;
- grinding the foremost end of said cylindrical ferrule member at a right angle relative to the central axis plane; and
- grinding said cylindrical ferrule member to reach the central axis plane until one half of the cylindrical ferrule member is removed.

20. A light diverging/converging device in the form of a 2×2 circuit diverging unit, comprising;
- a double circuit diverging ferrule serving as a structural element on a first side of said device;
- two optical fibers each extending from said diverging ferrule; and
- two single core optical fiber ferrules each serving as a structural element on a second side of the device, each of said two single core optical fiber ferrules being prepared by the steps of
- inserting an optical fiber having a sheath removed therefrom through a central fine hole of a cylindrical ferrule member and secured to said ferrule member by an adhesive while extending along a central axis thereof, and
- grinding the foremost end of said cylindrical ferrule member at a right angle relative to the central axis.

21. A light diverging/converging device in the form of a tree type light diverging/converging device comprising a plurality of 2×2 circuit light diverging units, each including
- a double circuit diverging ferrule serving as a structural element on a first side of said device;
- two optical fibers each extending from said diverging ferrule; and
- two single core optical fiber ferrules each serving as a structural element on a second side of the device, wherein said plurality of 2×2 circuit light diverging units are removably successively connected to each other to build a 1×2N circuit or a 2N×2N circuit, where N is an integer.

22. A light diverging/converging device in the form of a star tree type light diverging/converging device comprising a plurality of 2×2 circuit light diverging units, each including
   a double circuit diverging ferrule serving as a structural element on a first side of said device;
   two optical fibers each extending from said diverging ferrule; and
   two single core optical fiber ferrules each serving as a structural element on a second side of the device, wherein said plurality of 2×2 circuit light diverging units are removably successively connected to each other to build a 1×2N circuit or a 2N×2N circuit, wherein N is an integer.

23. A method of producing a structural element for a light diverging/converging device in the form of a double circuit diverging ferrule, comprising the steps of
   inserting an optical fiber having a sheath removed therefrom through a central fine hole of a cylindrical ferrule member having a stepped hole formed therein to immovably hold said optical fiber with an adhesive;
   filling said stepped hole with an adhesive to locate said optical fiber at an offset position away from a central axis plane;
   grinding the foremost end of said cylindrical ferrule member at a right angle relative to the central axis plane;
   grinding said cylindrical ferrule member to form a first semicylindrical ferrule element extending along the central axis plane until one half of said cylindrical ferrule member is removed;
   preparing a second semicylindrical ferrule element having the same configuration as that of said first semicylindrical element by the foregoing steps;
   bringing the first and second semicylindrical ferrule elements in close contact with each other to establish a face-to-face relationship therebetween; and
   press-fitting a cylindrical assembly of the first and second semicylindrical ferrule elements into a cylindrical bushing to build an integral structure.

24. A method of producing a structural element for a light diverging/converging device in the form of a single circuit converging ferrule, comprising the steps of
   inserting an optical fiber having a sheath removed therefrom through a central fine hole of a cylindrical ferrule member having a stepped hole formed therein to immovably hold said optical fiber with an adhesive;
   filling said stepped hole with an adhesive to locate said optical fiber at an offset position away from a central axis plane;
   grinding the foremost end of said cylindrical ferrule member at a right angle relative to the central axis plane;
   grinding said cylindrical ferrule member to form a first semicylindrical ferrule element along the central axis plane until one half of said cylindrical ferrule member is removed;
   preparing a second semicylindrical solid ferrule element having no optical fiber included therein;
   bringing the first and second semicylindrical ferrule elements into close contact with each other to establish a face-to-face relationship therebetween; and
   press-fitting a cylindrical assembly of the first and second semicylindrical ferrule elements into a cylindrical bushing to build an integral structure.

* * * * *